United States Patent
Hahn et al.

(10) Patent No.: US 9,368,129 B1
(45) Date of Patent: Jun. 14, 2016

(54) DISK DRIVE SUSPENSION HAVING DUAL VIBRATION DAMPER

(71) Applicant: Magnecomp Corporation, Murrieta, CA (US)

(72) Inventors: Peter Hahn, Wildomar, CA (US); Steve Misuta, Temecula, CA (US)

(73) Assignee: MAGNECOMP CORPORATION, Murrieta, CA (US)

( * ) Notice: Subject to any disclaimer, the term of this patent is extended or adjusted under 35 U.S.C. 154(b) by 0 days.

(21) Appl. No.: 14/806,789

(22) Filed: Jul. 23, 2015

Related U.S. Application Data

(60) Provisional application No. 62/030,420, filed on Jul. 29, 2014.

(51) Int. Cl.
*G11B 3/12* (2006.01)
*G11B 3/18* (2006.01)
*G11B 5/48* (2006.01)

(52) U.S. Cl.
CPC ............ *G11B 3/12* (2013.01); *G11B 3/124* (2013.01); *G11B 3/18* (2013.01); *G11B 5/4833* (2013.01)

(58) Field of Classification Search
CPC .............. G11B 3/12; G11B 3/18; G11B 3/124
See application file for complete search history.

(56) References Cited

U.S. PATENT DOCUMENTS

| | | | |
|---|---|---|---|
| 6,536,555 B1 | 3/2003 | Kelsic et al. | |
| 6,594,114 B1* | 7/2003 | Suzuki | G11B 5/4833 360/244.3 |
| 6,697,225 B2 | 2/2004 | Wittig et al. | |
| 6,954,328 B2* | 10/2005 | Daniel | G11B 33/08 360/99.19 |
| 6,958,890 B1* | 10/2005 | Lin | G11B 5/4826 360/244.6 |
| 7,933,097 B1 | 4/2011 | Lowry et al. | |
| 7,983,008 B2* | 7/2011 | Liao | G11B 5/4833 360/294.4 |
| 8,197,190 B2* | 6/2012 | Garcin | F01D 17/16 156/73.6 |
| 8,432,641 B1* | 4/2013 | Nguyen | G11B 5/4833 360/265.9 |
| 8,861,141 B2* | 10/2014 | Bjorstrom | G11B 5/482 360/244.8 |
| 9,153,261 B1* | 10/2015 | Kerner | B32B 7/12 |
| 2002/0141108 A1* | 10/2002 | Daniel | G11B 33/08 360/99.19 |
| 2003/0202284 A1* | 10/2003 | Arya | G11B 5/484 360/244.3 |
| 2004/0264055 A1* | 12/2004 | Wright | G11B 5/484 360/244.9 |
| 2008/0094758 A1* | 4/2008 | Liao | G11B 5/4833 360/294.4 |
| 2011/0211280 A1* | 9/2011 | Chen | G11B 5/4833 360/254 |

* cited by examiner

*Primary Examiner* — Carlos E Garcia
(74) *Attorney, Agent, or Firm* — Intellectual Property Law Offices of Joel Voelzke, APC

(57) ABSTRACT

A vibration damper for a suspension has two different viscoelastic layers and two different constraint layers. The two viscoelastic layers can be tailored to have different properties, including different viscosities and/or peak vibration frequency damping at different frequencies. The vibration damper exhibits improved vibration damping as compared to a single layer damper having the same overall thickness at critical frequencies.

20 Claims, 4 Drawing Sheets

DISK DRIVE SUSPENSION HAVING DUAL VIBRATION DAMPER

CROSS-REFERENCE TO RELATED APPLICATIONS

This application claims benefit of U.S. provisional patent Application No. 62/030,420 filed Jul. 29, 2014, which is incorporated by reference as if set forth fully herein.

BACKGROUND OF THE INVENTION

1. Field of the Invention

This invention relates to the field of disk drive suspensions. More particularly, this invention relates to the field of a disk drive suspension having a dual vibration damper.

2. Description of Related Art

Disk drives such as magnetic hard disk drives for memory storage spin at speeds of up to 10,000 RPM. The spinning disk causes vibrations within the disk drive. Other sources of vibration exist within an operating disk drive including windage. The vibration can cause off-track errors at the head suspension. There is therefore a need to minimize vibration at the head suspension in order to minimize off-track errors.

Vibration dampers for the purpose of reducing vibration of the head suspension are known. FIG. 1 is a top perspective view of a disk drive suspension 10 including a load beam 12 having a vibration damper 20 according to the prior art. Such vibration dampers typically include a viscoelastic layer 22 of material that acts as a vibration damping material, and a cover layer or constraint layer 24. There is, however, a continuing need to more effectively reduce vibration in a disk drive.

SUMMARY OF THE INVENTION

According to the present invention, a dual vibration damper for a disk drive head suspension contains two layers of viscoelastic damping material, and two constraint layers. Those layers are stacked vertically on top of one other as: a first viscoelastic material adhered to the load beam; a first constraint layer thereon; then a second viscoelastic material; and finally a second constraint layer.

The two viscoelastic damping materials and layers can have different properties, and the two constraint layers can also have different properties and/or geometries. For example, the first damping layer can provide effective damping at a first temperature, and the second damping layer can provide effective damping at a second and different temperature. Similarly, the first damping layer together with its constraint layer could provide effective damping at a first frequency, and the second damping layer together with its constraint layer could provide effective damping at a second and different frequency, so that the two sets of layers taken together provide effective damping at two different resonant modes such as first and second torsional modes, or a first torsional mode frequency and a first bending mode frequency. The first viscoelastic layer together with the first constraint layer could exhibit a peak attenuation at a first frequency, and the second viscoelastic layer together with the second constrain layer exhibit a peak attention at a second frequency.

More generally, the damper comprises n layers of viscoelastic materials and n or less than n constraint layers.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
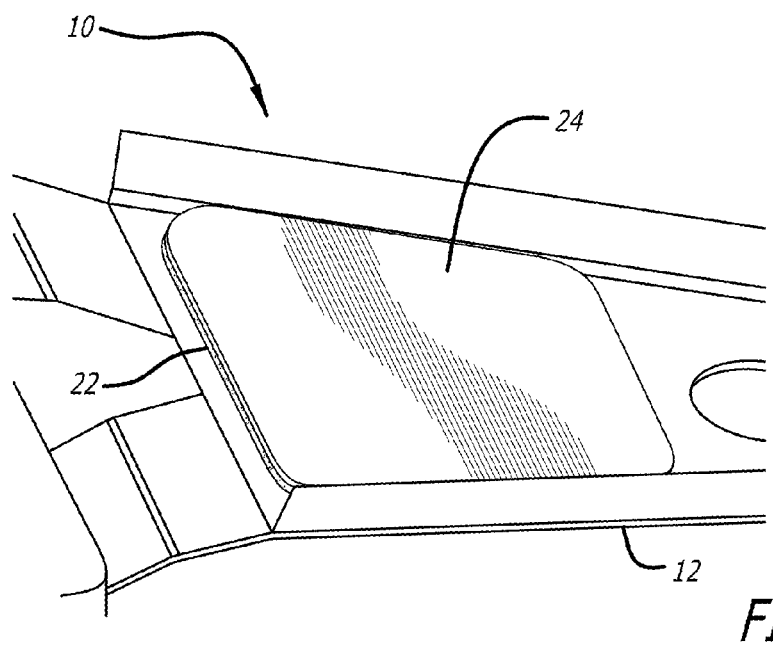
FIG. 1 is a top perspective view of a disk drive suspension including a vibration damper according to the prior art.
Figure 2:
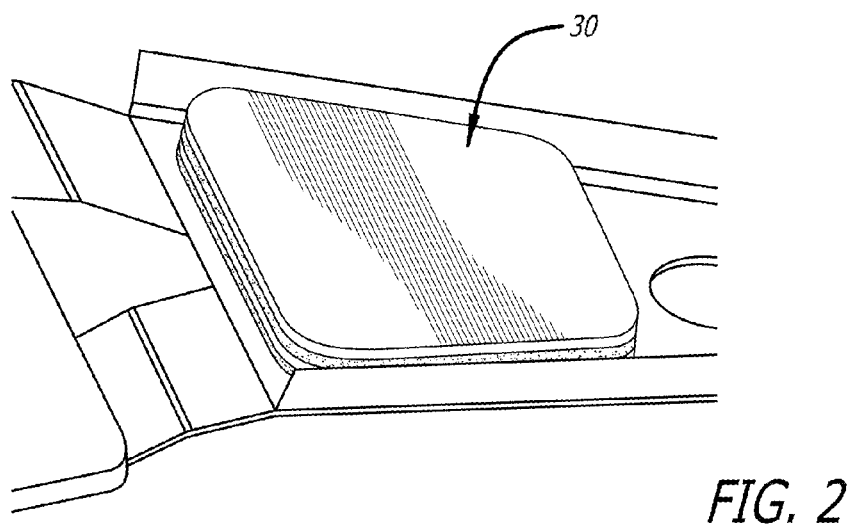
FIG. 2 is a top perspective view of a dual vibration damper according to an exemplary embodiment of the invention.
Figure 3:
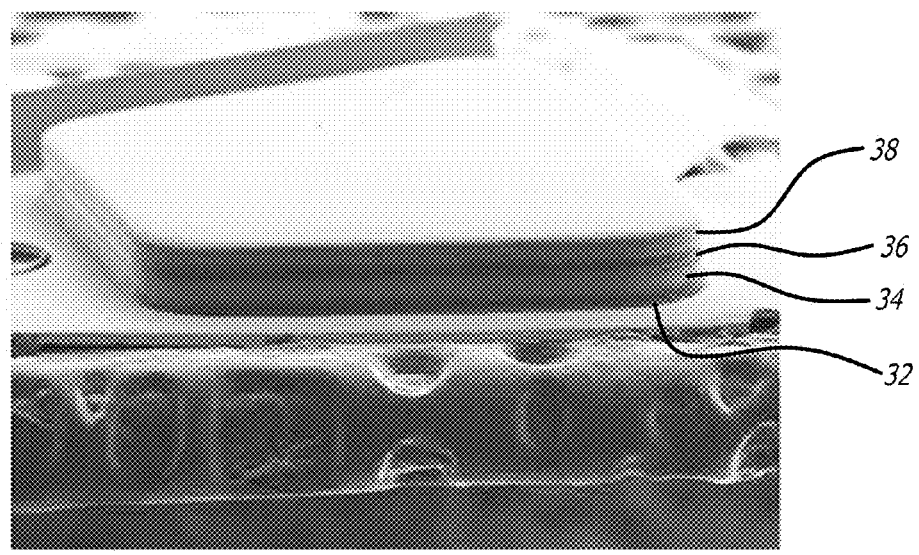
FIG. 3 is a top perspective scanning electron microscope (SEM) photograph of a dual vibration damper according to the embodiment of FIG. 2.

FIG. 2 is a top perspective view of a suspension 10 including a dual vibration damper 30 according to an exemplary embodiment of the invention. The dual damper configuration was originally developed to test the feasibility of cutting thicker material than the material that is conventionally used for vibration dampers, and the resulting damping effect on the head gimbal assembly (HGA). As can be seen in FIG. 3, which is a scanning electron microscope (SEM) photograph of a dual vibration damper 30 according to the embodiment of FIG. 2, clean cutting of the laminated material to form the damper is feasible.

Figure 4:
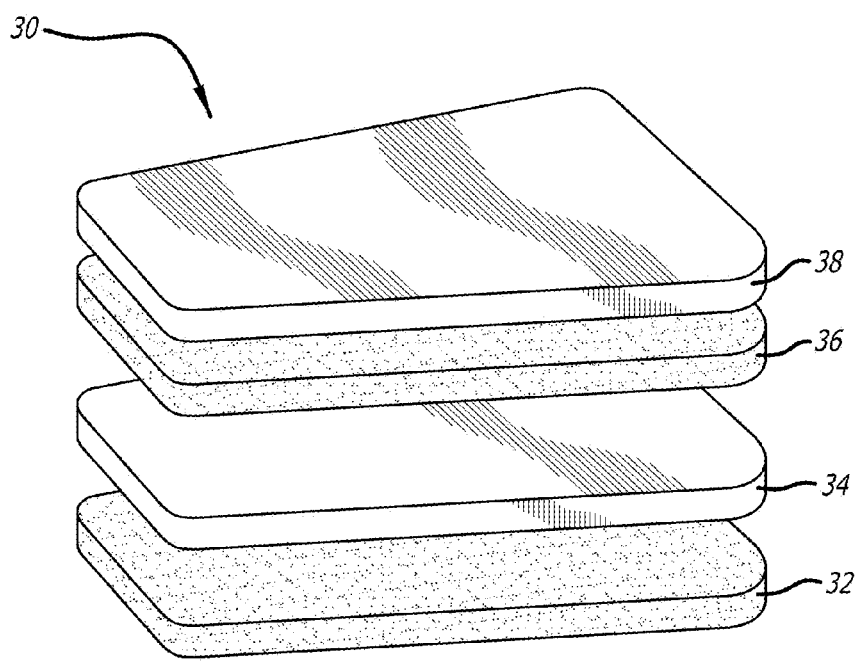
FIG. 4 is an exploded view of the dual vibration damper of FIG. 2.

FIG. 4 is an exploded view of the dual vibration damper 30 of FIG. 2. Dual vibration damper 30 includes a first damping layer 32, a first constraint layer 34 thereon, then a second damping layer 36, and finally a second constraint layer 38, the layers being vertically stacked.

Damping layers 32 and 36 can comprise two different materials and/or different material properties, such as viscoelastic materials that differ in the temperatures at which they are most effective, thus making the damper's vibration absorbing ability more uniform as the temperature varies. For example, damping layer 32 and 36 could exhibit the same viscosities but at different temperatures, such as at temperature that differ by at least 10° C., or at least 20° C. The damping layers and constraint layers could be selected so as to have peak attenuation at a mechanical resonant frequency of the disk drive, with the first viscoelastic layer providing peak attenuation at a mechanical resonant frequency within a lower half of a specified operating temperature range of the disk drive assembly in which the suspension is mounted, and the second viscoelastic layer providing that peak attenuation at that mechanical resonant frequency within an upper half of a specified operating temperature range of the disk drive assembly. The first viscoelastic layer together with the first constraint layer could exhibit a peak attenuation at a first frequency, and the second viscoelastic layer together with the second constrain layer exhibit a peak attention at a second frequency, the first and second frequencies differing by at least 5%, or at least 10%, or at least 25%.

Furthermore, the two different materials can be selected for different viscosities and elasticities, and more generally for other characteristics as well, in order to optimize the combined effect of the two different dampers over a variety of conditions and frequencies.

Constraint layers 34, 38 can comprise a variety of materials that are known and used for constraint layers of viscoelastic dampers such as Mylar® such as Mylar® A or Kapton®. Those materials have Young's moduli of approximately 2.7 GPa and 2.5 GPa, respectively, at 23° C. More preferably, constraint layers 34 and 38 are made of a stiff material such as stainless steel, which has a Young's modulus of approximately 180 GPa at 23° C. Preferably the constraint layer has a Young's modulus of at least 1 GPa at 23° C., and more preferably has a Young's Modulus of at least 100 GPa at 23° C.

Constraint layer 34 could even be eliminated such that the damper comprises two adjacent layers of different viscoelastic materials with a single constraint layer. The dual damper would thus comprises a first viscoelastic layer next to the load beam, a second viscoelastic layer having at least one different property from the first viscoelastic layer next to that first viscoelastic layer, and an only constraint layer on the second viscoelastic layer.

Other characteristics of the various layers can be selected either individually or taken together in order to optimize various performance parameters depending on the load beam and the suspension's expected operating conditions and parameters including disk RPMs. The materials, thicknesses, geometries, and masses of the various layers can be tailored to optimize the resulting overall damper performance.

Figure 5:
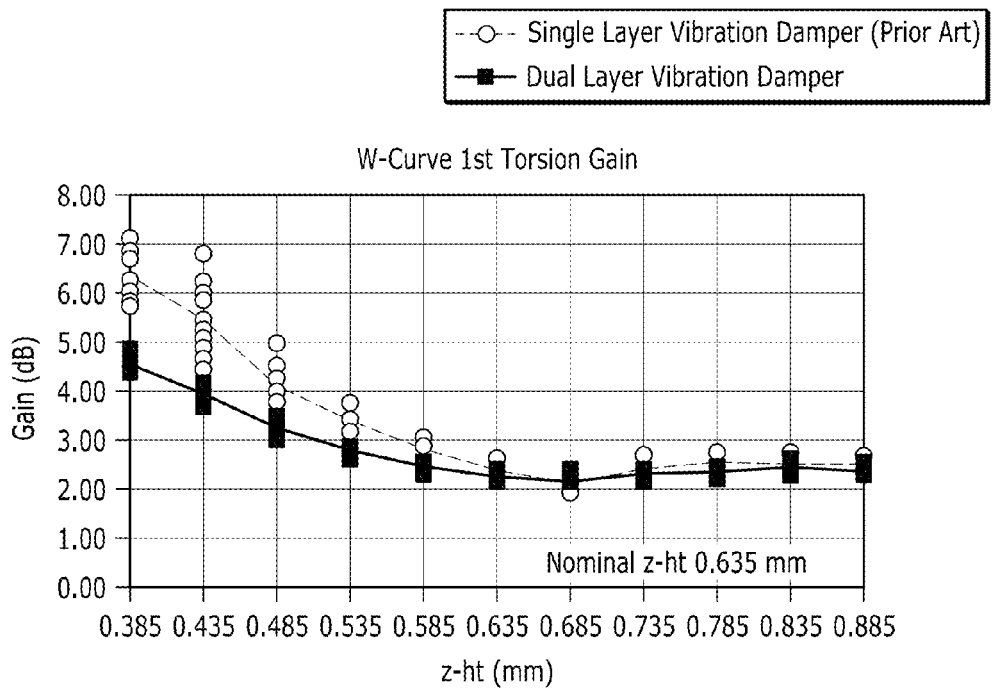
FIG. 5 is a graph showing first torsion gain as a function of z-height for the vibration damper and suspension of FIG. 2.

FIG. 5 is a graph showing first torsion mode (T1) gain as a function of z-height for the suspension of FIG. 2 including dual vibration damper 30, and also showing for comparison the corresponding data for a standard single layer vibration damper. As can be seen, the suspension having the dual damper configuration exhibits a lower T1 gain particularly at lower z-heights. Reducing T1 gain in a suspension is highly desirable.

As used herein the term z-height refers to the difference between the slider flying surface and the mount plate contact surface in the actuator arm. The z-height is thus the total vertical space that the head gimbal assembly (HGA) occupies in the vertical stack of the hard disk drive (HDD) assembly. The nominal z-height for a suspension lies in the middle of the range shown in FIG. 5. Within a stack of disks within an HDD assembly, the actual z-heights of the suspensions vary due to the tolerance of the stack up in the assemblies. Sometimes arm distortion creates significant variation in z-heights for the different suspensions within the stack. Sometimes the base housing, spindle motor, and disk spacers cause sizable variations. The end result is that windage and frequency response (FRF) can vary significant depending on the W curve behavior.

A second advantage to the dual damper of the present invention is that, as can be seen in the figure, the suspension having the dual damper exhibits a flatter W-curve than a suspension having only the single damper of the prior art. Due to the variations in the z-heights of the suspensions within a disk stack discussed above, the T1 gain and other vibrational modes for the different suspensions can vary significantly. It is therefore important that the T1 gain vary as little as possible as a function of z-height, i.e., that the curve be as flat as possible as a function of z-height. The present invention achieves the desired result of flattening the curve of T1 gain as a function of z-height, i.e., the invention makes the T1 gain less dependent on the variable of z-height, and thus makes the performance of the various suspensions within a disk stack more uniform and predictable despite the unavoidable variance in z-heights.

Figure 6:
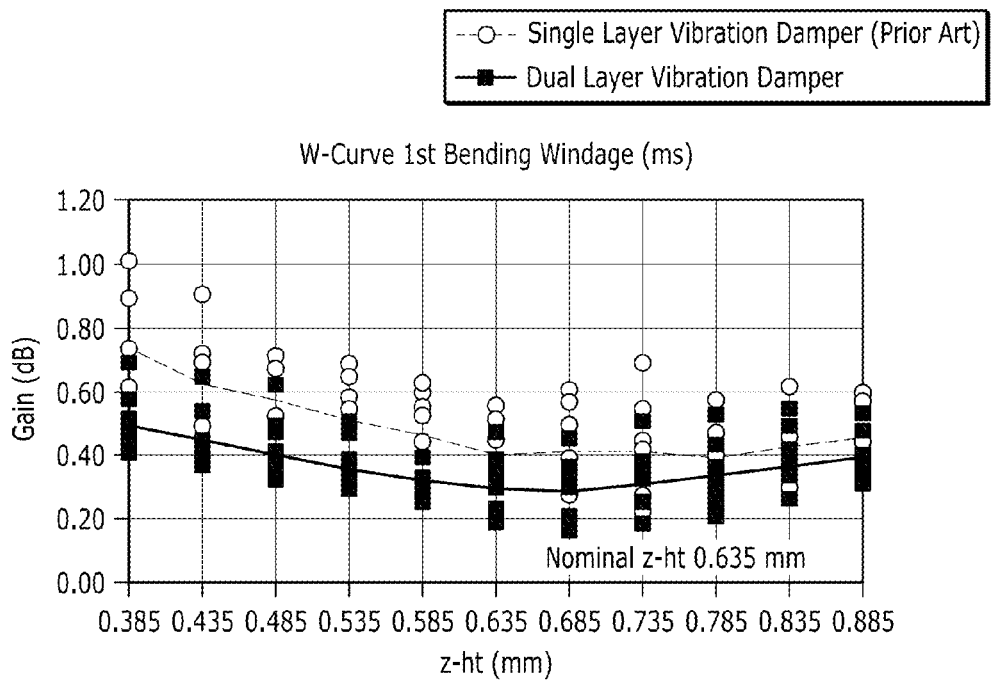
FIG. 6 is a graph showing root mean square (RMS) first bending windage vibration as a function of z-height for the vibration damper and suspension of FIG. 2.
Figure 7:
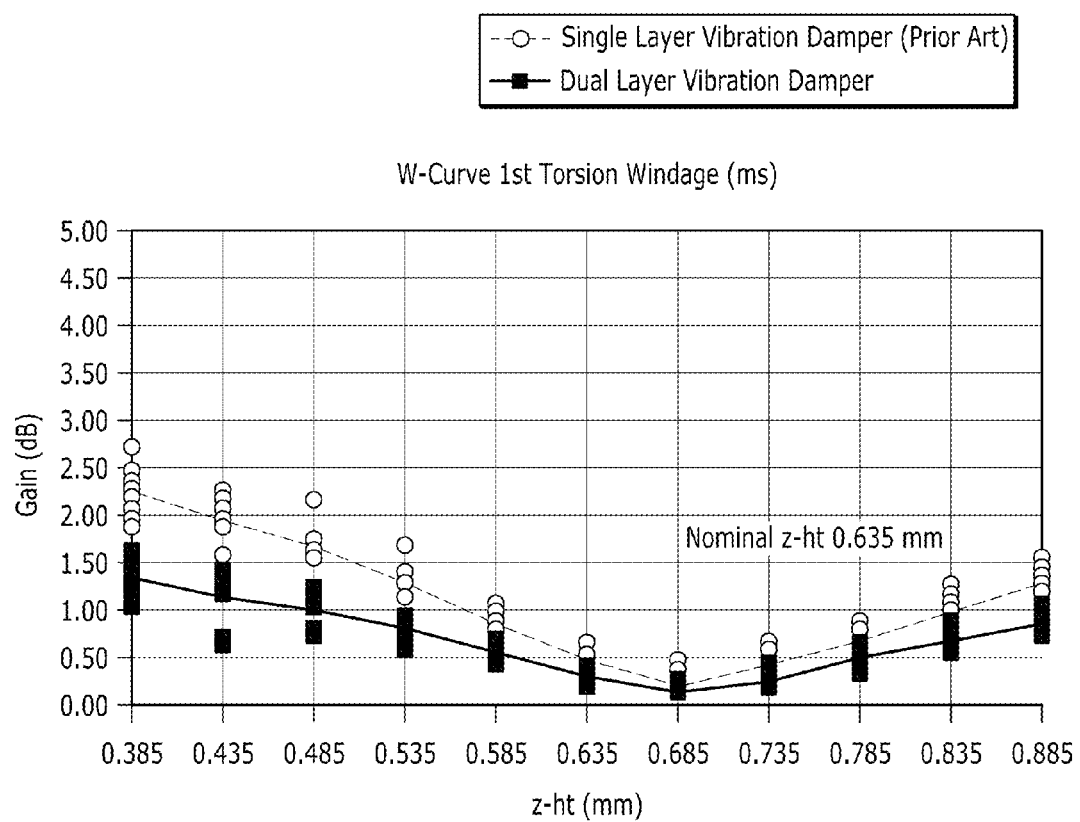
FIG. 7 is a graph showing root mean square (RMS) first torsion windage vibration as a function of z-height for the vibration damper and suspension of FIG. 2.

FIGS. 6 and 7 show the first bending windage vibration (B1) gain and first torsion windage vibration (T1) gain, respectively, as a function of z-height for the suspension of FIG. 2 including the dual vibration damper 30, and also showing for comparison the corresponding data for a standard single layer vibration damper. The graphs show the dual damper design to be more effective at damping vibrations. The B1 data shows particular improvement using the dual damper design, with the B1 number being improved for all z-height conditions.

The present invention is not limited to a damper having dual damping layers. A damper according to the invention could more generally comprise n layers.

The different damping layers could have different shapes, footprints, and masses. When vertically stacked, the top damping layer could have a smaller footprint that the bottom damping layer and could be located on the bottom damping layer in order to optimize overall damping performance.

It will be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

We claim:

1. A disk drive suspension having a vibration damper, the vibration damper comprising:
   a first viscoelastic layer affixed to a load beam of the suspension on a top side of the load beam;
   a second viscoelastic layer affixed over the first viscoelastic layer; and
   a constraint layer affixed over the second viscoelastic layer;
   wherein the first viscoelastic layer, the second viscoelastic layer, and the constraint layer are vertically arranged relative to one another and are all located on the top side of the load beam.

2. The suspension of claim 1 wherein the first and second viscoelastic layers have different material properties.

3. The suspension of claim 1 wherein the first and second viscoelastic layers comprises different respective viscoelastic materials.

4. The suspension of claim 1 wherein the first viscoelastic layer has a predetermined viscosity at a first temperature, and the second viscoelastic layer has said predetermined viscosity at a second temperature, the first and second temperatures differing by at least 10° C.

5. The suspension of claim 1 wherein the first and second viscoelastic layers have different characteristics selected from the group of viscosity and elasticity.

6. The suspension of claim 1 wherein the constraint layer has a Young's modulus of greater than 1 GPa at 23° C.

7. A disk drive suspension having a vibration damper, the vibration damper comprising:
   a first viscoelastic layer affixed to a load beam of the suspension on a top side of the load beam;
   a second viscoelastic layer affixed over the first viscoelastic layer;

a constraint layer defining a first constraint layer affixed over the second viscoelastic layer, the first constraint layer being disposed between the first and second viscoelastic layers; and a second constraint layer affixed over the second viscoelastic layer.

8. The suspension of claim 7 wherein the first viscoelastic layer together with the first constraint layer exhibit a peak vibration attenuation at a first frequency, and the second viscoelastic layer together with the second constraint layer exhibit a peak vibration attention at a second frequency, the first and second frequencies differing by at least 5%.

9. The suspension of claim 8 wherein the first and second frequencies differ by at least 25%.

10. The suspension of claim 7 wherein the first and second constraint layers are selected from the group consisting of Mylar® and Kapton®.

11. The suspension of claim 7 wherein the first and second constraint layers comprise stainless steel.

12. The suspension of claim 7 wherein the second viscoelastic layer has a smaller footprint than the first viscoelastic layer.

13. A disk drive suspension having a dual vibration damper affixed thereto, the dual vibration damper comprising:
a first viscoelastic layer affixed on a top side of the suspension;
a first constraint layer on the first viscoelastic layer;
a second viscoelastic layer on the first constraint layer; and
a second constraint layer on the second viscoelastic layer;
wherein:
the first viscoelastic layer, the first constraint layer, the second viscoelastic layer, and the second constraint layer are vertically stacked and are all located on the top side of the load beam; and
the first and second constraint layers have a Young's modulus of greater than 1 GPa at 23° C.

14. The suspension of claim 13 wherein the first and second viscoelastic layers comprise different materials.

15. The suspension of claim 13 wherein the first viscoelastic layer has a predetermined viscosity at a first temperature, and the second viscoelastic layer has said predetermined viscosity at a second temperature, the first and second temperatures differing by at least 10° C.

16. The suspension of claim 13 wherein the first and second constraint layers each have a Young's Modulus of greater than 100 GPa at 23° C.

17. A disk drive suspension having a dual vibration damper, the dual vibration damper comprising:
a first viscoelastic layer;
a first constraint layer affixed to the first viscoelastic layer;
a second viscoelastic layer affixed to the first constraint layer; and
a second constraint layer affixed to the first viscoelastic layer;
wherein:
the first and second viscoelastic layers comprise first and second viscoelastic materials, respectively, the first and second viscoelastic materials having different viscoelastic properties; and
the first viscoelastic layer, the first constraint layer, the second viscoelastic layer, and the second constraint layer are vertically stacked on a common side of the suspension.

18. The suspension of claim 17 wherein said layers are vertically stacked on a same side of the suspension.

19. The suspension of claim 17 wherein the first and second viscoelastic layers have respective viscosities that differ by at least 5%.

20. The suspension of claim 17 wherein with the first viscoelastic layer provides a peak attenuation at a mechanical resonant frequency of the suspension within a lower half of a specified operating temperature range of a disk drive assembly in which the suspension is mounted, and the second viscoelastic layer provides a peak attenuation at said mechanical resonant frequency within an upper half of said specified operating temperature range of said disk drive assembly.

* * * * *